United States Patent
Kim et al.

(10) Patent No.: US 8,452,483 B2
(45) Date of Patent: May 28, 2013

(54) CELL-BASED VEHICLE DRIVING CONTROL METHOD AND SYSTEM

(75) Inventors: Do Hyun Kim, Daejeon (KR); Sung Won Sohn, Daejeon (KR); Jong-Hyun Park, Daejeon (KR); Byung Tae Jang, Daejeon (KR); Jeong Dan Choi, Daejeon (KR); Kyung Bok Sung, Daejeon (KR); Kyoung Hwan An, Daejeon (KR); Ju Wan Kim, Daejeon (KR); Seong Ik Cho, Daejeon (KR); Jungsook Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 334 days.

(21) Appl. No.: 12/819,658

(22) Filed: Jun. 21, 2010

(65) Prior Publication Data

US 2011/0130918 A1 Jun. 2, 2011

(30) Foreign Application Priority Data

Nov. 27, 2009 (KR) ........................ 10-2009-0115903

(51) Int. Cl.
*G06F 19/00* (2011.01)

(52) U.S. Cl.
USPC .......... 701/31.4; 701/468; 701/505; 701/515; 701/532; 340/8.1; 340/901; 340/928; 340/988; 340/905; 514/8.2; 514/9.1; 514/8.9; 514/9.6; 514/16.7; 455/228; 455/315; 141/5; 141/11; 141/82; 530/300; 530/840; 180/167

(58) Field of Classification Search
USPC .......... 701/31.4, 468, 505, 515, 532; 340/8.1, 340/901, 928, 988, 905, 933, 941; 342/20, 342/51, 357.31, 426, 450, 453, 457; 514/8.2, 514/9.1, 8.9, 9.6, 16.7, 17.1; 455/228, 315; 141/5, 11, 82; 530/300, 840; 180/167
See application file for complete search history.

(56) References Cited

U.S. PATENT DOCUMENTS 4,809,197 A * 2/1989 Tashiro et al. ............... 702/35
6,662,099 B2 * 12/2003 Knaian et al. ............... 701/117
(Continued)

FOREIGN PATENT DOCUMENTS

| JP | 11-102157 | 4/1999 |
|---|---|---|
| JP | 2002-321629 | 11/2002 |

(Continued)

OTHER PUBLICATIONS

Sung-Bum Hong et al., "AVLS Using the Dedicated Wireless Communication between Vehicle and Road-Side Equipment", Journal of the Korea Navigation Institute, vol. 4, No. 2, Dec. 2000.

(Continued)

*Primary Examiner* — McDieunel Marc
(74) *Attorney, Agent, or Firm* — Staas & Halsey LLP

(57) ABSTRACT

A cell-based vehicle driving control system includes a local server for obtaining road environment information on roads within a cell and target vehicle information on a target vehicle within the cell and generating local waypoints based on the road environment information and the target vehicle information; a global server for monitoring the target vehicle information, the road environment information and local server information on the local server received from the local server; and a vehicle control terminal, mounted in the target vehicle, for receiving the local waypoints from the local server and controlling the target vehicle based on the local waypoints. The road environment information is obtained by using at least one sensor installed on the roads.

18 Claims, 6 Drawing Sheets

U.S. PATENT DOCUMENTS

| | | | |
|---|---|---|---|
| 7,499,776 B2 | 3/2009 | Allard et al. | |
| 8,020,657 B2 * | 9/2011 | Allard et al. | 180/167 |
| 8,164,543 B2 * | 4/2012 | Seder et al. | 345/7 |
| 8,170,770 B2 * | 5/2012 | Grolle | 701/96 |
| 8,195,342 B2 * | 6/2012 | Anderson | 701/1 |
| 8,195,358 B2 * | 6/2012 | Anderson | 340/988 |
| 8,200,428 B2 * | 6/2012 | Anderson | 701/453 |
| 8,224,500 B2 * | 7/2012 | Anderson | 701/1 |
| 2002/0075180 A1 | 6/2002 | Sakai et al. | |
| 2002/0198631 A1 | 12/2002 | Ryoo | |
| 2006/0089097 A1 * | 4/2006 | Wang et al. | 455/3.02 |
| 2007/0185643 A1 * | 8/2007 | Yamane et al. | 701/117 |
| 2008/0130019 A1 * | 6/2008 | Sakamoto | 358/1.1 |
| 2012/0046820 A1 * | 2/2012 | Allard et al. | 701/25 |

FOREIGN PATENT DOCUMENTS

| | | |
|---|---|---|
| KR | 10-2002-0032302 | 5/2002 |
| KR | 10-2002-0097362 | 12/2002 |
| KR | 10-2006-0084289 | 7/2006 |
| KR | 10-2007-0028486 | 3/2007 |
| KR | 10-2009-0104500 | 10/2009 |

OTHER PUBLICATIONS

Pravin Varaiya, "Smart Cars on Smart Roads: Problems of Control", IEEE Transactions on AutomaticControl, vol. 38, No. 2, pp. 195-207, Feb. 1993.

* cited by examiner

FIG. 3

| NODE IDENTIFIER | X,Y,Z COORDINATES | ATTRIBUTE 1 | ... | ATTRIBUTE N |

FIG. 4

| LINK IDENTIFIER | NODE IDENTIFIER | NODE IDENTIFIER | ATTRIBUTE 1 | ... | ATTRIBUTE N |

CELL-BASED VEHICLE DRIVING CONTROL METHOD AND SYSTEM

CROSS-REFERENCE TO RELATED APPLICATIONS

This application is based upon and claims the benefit of priority from Korean Patent Application No. 10-2009-0115903 filed on Nov. 27, 2009, the entire contents of which are incorporated herein by reference.

FIELD OF THE INVENTION

The present invention relates to a vehicle driving control technology; and, more particularly, to a cell-based vehicle driving control method and system, in which vehicle driving is controlled based on cell-based road infrastructure information including vehicle information, obstacle information and road environment information in a cell.

BACKGROUND OF THE INVENTION

Recently, researches on automated vehicle driving have been actively being conducted. As a result, intelligent active safety and driver assistance systems using sensors equipped in a vehicle were developed to prevent accidents during driving and improve driver's convenience and driving feeling. Further, unmanned autonomous vehicle systems for traveling to a destination by controlling various control devices in a vehicle without driver's manipulation are being studied.

The conventional intelligent vehicle systems and unmanned autonomous vehicle systems mount effective sensors on a vehicle to recognize driving environment and situation in local areas. However, since not only the sensors are expensive but also recognition ranges of the conventional systems are limited to local areas, it is difficult to commercialize the conventional systems.

Therefore, there comes a need for autonomous driving or autonomous vehicle guidance technology based on interaction between road infrastructure devices and vehicle devices, rather than independently operating systems using sensors mounted in a vehicle.

SUMMARY OF THE INVENTION

In view of the above, the present invention provides a cell-based vehicle driving control technology, in which road infrastructure devices, i.e., a global server and local servers, collect information on driving conditions to provide control information to a vehicle, i.e., a vehicle control terminal, and the vehicle control terminal performs vehicle driving control based on the received control information.

In accordance with an aspect of the present invention, there is provided a cell-based vehicle driving control method, including:

obtaining road environment information on roads within a cell and target vehicle information on a target vehicle within the cell; and generating local waypoints based on the road environment information and the target vehicle information and transmitting the local waypoints to the target vehicle.

Preferably, the road environment information is obtained by using at least one sensor installed on the roads and includes information on obstacles on the roads and road condition of the roads.

Preferably, said at least one sensor includes an image sensor, a laser sensor, a radar sensor and an ultrasonic sensor.

Preferably, the local waypoints are coordinate spaces within the cell on which the target vehicle can travel.

In accordance with another aspect of the present invention, there is provided a cell-based vehicle driving control method, including:

receiving local waypoints in a cell from a local sever provided for the cell;

measuring a location and driving status of a target vehicle within the cell;

generating vehicle control data for the target vehicle based on the received local waypoints and the measured location and driving status of the target vehicle; and controlling the target vehicle according to the generated vehicle control data.

Preferably, the location of the target vehicle is measured by using one or more of GPS (Global Positioning System) information and IMU (Inertial Measurement Unit) information of the target vehicle.

Preferably, the driving status of the target vehicle includes one or more of a headway angle of the target vehicle with respect to a traveling traffic lane and a steering wheel angle of the target vehicle.

Preferably, the vehicle control data includes one or more of a rotation angle of a steering wheel and a stepping amount of an accelerator or a brake.

The vehicle driving control method of may further include collecting the driving status of the target vehicle; analyzing the collected driving status to generate target vehicle information; and transmitting the target vehicle information to the local server.

In accordance still another aspect of the present invention, there is provided a cell-based vehicle driving control system, including:

a local server for obtaining road environment information on roads within a cell and target vehicle information on a target vehicle within the cell and generating local waypoints based on the road environment information and the target vehicle information, the road environment information being obtained by using at least one sensor installed on the roads;

a global server for monitoring the target vehicle information, the road environment information and local server information on the local server received from the local server; and a vehicle control terminal, mounted in the target vehicle, for receiving the local waypoints from the local server and controlling the target vehicle based on the local waypoints.

Preferably, said at least one sensor includes an image sensor, a laser sensor, a radar sensor and an ultrasonic sensor.

Preferably, the local server information includes a location and operational status of the local server.

Preferably, the global server administrates a handover procedure of the target vehicle when the target vehicle moves from the cell managed by the local server to a cell managed by another local server.

Preferably, the local server wirelessly receives the target vehicle information from the vehicle control terminal and wirelessly transmits the local waypoints to the vehicle control terminal; and wherein the local server transmits the target vehicle information, the road environment information and the local server information to the global server.

Preferably, the road environment information includes information on obstacles on the roads and road condition of the roads.

Preferably, the global server includes an interface for receiving the target vehicle information and the road environment information from the local server; an analysis unit for analyzing the target vehicle information and the road environment information received via the interface; and a road network database for storing therein road network data modeled from actual road data, wherein analysis unit manages the road network data by using analysis results thereof.

Preferably, the road network data includes node data and link data.

Preferably, the local server includes an interface for receiving the target vehicle information from the vehicle control terminal, transmitting the local waypoints to the vehicle control terminal and transmitting the target vehicle information, the road environment information and the local server information to the global server; an information collection unit for collecting the target vehicle information received via the interface; a sensing unit for obtaining the road environment information by using said at least one sensor and detecting abnormalities of said at least one sensor; and an analysis unit for generating the local waypoints and providing the local waypoints to the interface.

Preferably, the target vehicle information includes whether the target vehicle can move or not, status of components of the target vehicle and whether abnormalities have occurred in the target vehicle.

Preferably, the vehicle control terminal includes an interface for receiving the local waypoints from the local server; an information collection unit for collecting the local waypoints received via the interface; a sensing unit for obtaining driving status of the target vehicle, the driving status including a location of the target vehicle, a headway angle of the target vehicle with respect to a traveling traffic lane and a steering wheel angle of the target vehicle; an analysis unit for analyzing the local waypoints collected by the information collection unit and the driving status of the target vehicle sensed by the sensing unit; and a vehicle control unit for generating vehicle control data based on the local waypoints and the driving status information analyzed by the analysis unit, and controlling the target vehicle according to the generated vehicle control data.

According to the vehicle driving control method and system using road infrastructure of the present invention, since information on obstacles on the road and road condition are collected by road infrastructure and vehicle control information generated based on such information is provided to a target vehicle, convenient and safe autonomous vehicle driving can be provided while reducing device complexity of the target vehicle.

BRIEF DESCRIPTION OF THE DRAWINGS

The above features of the present invention will become apparent from the following description of embodiments given in conjunction with the accompanying drawings, in which:

FIG. 3 illustrates a data structure of node data in the road network DB of FIG. 2;

FIG. 4 illustrates a data structure of link data in the road network DB of FIG. 2;

DETAILED DESCRIPTION OF THE EMBODIMENTS

Hereinafter, embodiments of the present invention will be described in detail with reference to the accompanying drawings, which form a part hereof.

Figure 1:
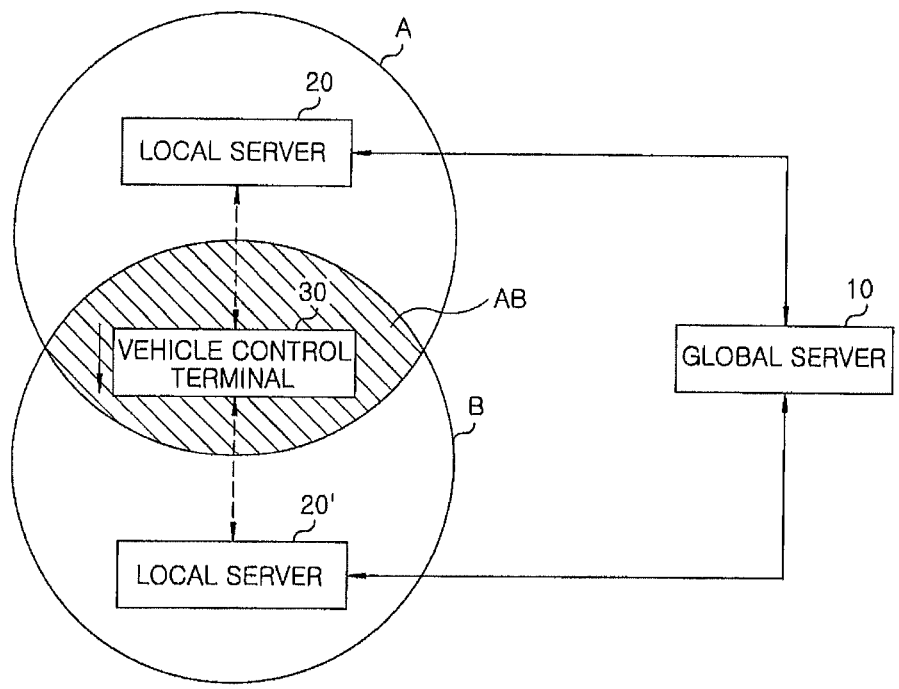
FIG. 1 illustrates an exemplary view of a cell-based vehicle driving control system in accordance with an embodiment of the present invention.

FIG. 1 illustrates an exemplary view of a cell-based vehicle driving control system in accordance with an embodiment of the present invention.

The vehicle driving control system includes a global server 10, local servers 20 and 20' and a vehicle control terminal 30.

The following description of the embodiment is based on the assumption that various types of sensors, e.g., image sensors, laser sensors, radar sensors and ultrasonic sensors, can be installed on the road. By using these sensors, vehicle driving information and vehicle status information in a specific cell can be detected.

As shown in FIG. 1, the global server 10 receives from the local servers 20 and 20' information on obstacles on the road, e.g., pedestrians and vehicles on the road, and information on locations and operational status of the local servers 20 and 20' and monitors the received information.

The global server 10 may administrate a handover procedure between a target vehicle and the local servers 20 and 20'. The handover procedure is necessary for seamless vehicle driving control on a target vehicle travelling on the road. For example, as shown in FIG. 1, when a target vehicle having the vehicle control terminal 30 equipped therein and moving from a cell coverage A of the local server 20 to a cell coverage B of the local server 20' is located in an area AB where the cell coverage A and the cell coverage B overlap each other, the global server 10 may perform a handover procedure such that a connection between the local server 20 and the vehicle control terminal 30 is switched to a connection between the local server 20' and the vehicle control terminal 30. The global server 10 will be described in detail later with reference to FIG. 2.

The local server 20 may wirelessly transmit and receive information to and from the vehicle control terminal 30 located within its cell coverage A. The local server 20 may store and analyze the received information to provide analyzed information to the vehicle control terminal 30 and the global server 10.

The local server 20' may wirelessly transmit and receive information to and from the vehicle control terminal 30 located within its cell coverage B. The local server 20' may store and analyze the received information to provide analyzed information to the vehicle control terminal 30 and the global server 10.

Here, the information handled by the local server 20 or 20' may include road infrastructure information to be transmitted to the vehicle control terminal 30, road infrastructure information to be transmitted to the global server 10 and target vehicle information received from the vehicle control terminal 30 of a target vehicle located in the cell coverage of the local server. The road infrastructure information to be transmitted to the vehicle control terminal 30 includes, e.g., information on obstacles and road environment. The road infrastructure information to be transmitted to the global server 10 includes, e.g., information on the target vehicle, status of sensors, status of the local server. The target vehicle information includes, e.g., information on whether the target vehicle can move or not, information on status of vehicle components and information on whether abnormalities have occurred in the vehicle.

For convenience of explanation, only the local server 20 and the local server 20' are connected to the global server 10 and to the vehicle control terminal 30 in FIG. 1. However, it should be noted that the vehicle driving control system may include one or more additional local servers which can transmit and receive information to and from the vehicle control terminal 30 and the global server 10.

The vehicle control terminal 30 is mounted in the target vehicle and is configured to receive local waypoints (to be described later) from the local server 20 or 20'. The vehicle control terminal 30 may determine vehicle control data for the target vehicle, e.g., steering angle control information, accelerator control information and brake control information, based on the local waypoints and generate drive control signals to control the target vehicle. The vehicle control terminal 30 will be described in detail later with reference to FIG. 6.

Figure 2:
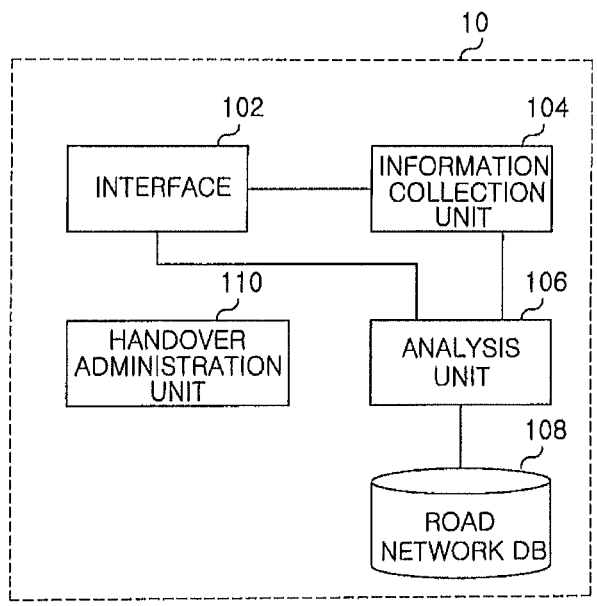
FIG. 2 illustrates a detail view of the global server of FIG. 1.

FIG. 2 illustrates a detail view of the global server 10 of FIG. 1. As shown in FIG. 2, the global server 10 may include an interface 102, an information collection unit 104, an analysis unit 106, a road network database (DB) 108 and a handover administration unit 110.

The interface 102 receives information provided by the local servers 20 and 20', e.g., information on obstacles on the road and information on locations and operational status of the local servers 20 and 20'. Further, the interface 102 transmits analysis results provided by the analysis unit 106 (to be described later) to the local servers 20 and 20'.

The information collection unit 104 collects the information received from the local servers 20 and 20' via the interface 102 and provides the collected information to the analysis processing unit 106.

The analysis unit 106 analyzes the collected information provided by the information collection unit 104 by using data stored in the road network DB 108 and provides analysis results to the interface 102.

The road network DB 108 stores therein road network data obtained by modeling actual road data. The road network data may be managed by the analysis unit 106. The road network data may include node data containing information on a specific node and link data containing information on a link between two nodes.

FIG. 3 illustrates a data structure of node data in the road network DB 108 of FIG. 2. As shown in FIG. 3, the node data includes a node identifier, coordinates of the node and a plurality of attribute fields.

FIG. 4 illustrates a data structure of link data in the road network DB 108 of FIG. 2. As shown in FIG. 4, the link data includes a link identifier, two node identifiers and a plurality of attribute fields.

Referring back to FIG. 2, the handover administration unit 110 administrates a handover procedure when a target vehicle moves from a cell managed by a local server to a cell managed by other local server. For example, as shown in FIG. 1, when the vehicle control terminal 30 is located within the area AB where the cell coverage A and the cell coverage B overlap each other, the handover administration unit 110 administrates a handover procedure such that a connection between the local server 20 and the vehicle control terminal 30 is switched to a connection between the local server 20' and the vehicle control terminal 30.

Figure 5:
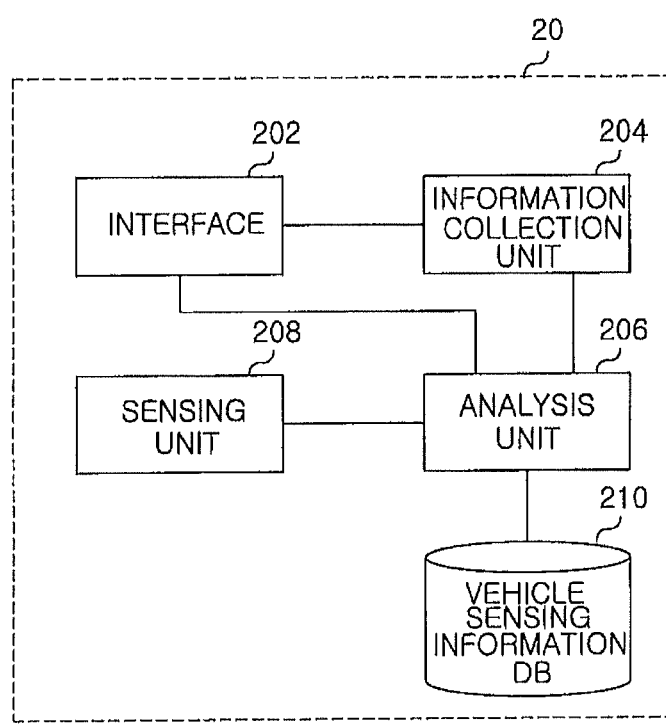
FIG. 5 illustrates a detail view of the local server of FIG. 1.

FIG. 5 illustrates a detail view of the local server 20 and 20' of FIG. 1. As shown in FIG. 5, the local server 20 and 20' may include an interface 202, an information collection unit 204, an analysis unit 206, a sensing unit 208 and a vehicle sensing information database (DB) 210.

The interface 202 receives information on a target vehicle, e.g., information on whether the target vehicle can move or not, information on status of components of the target vehicle and information on whether abnormalities have occurred in the target vehicle, from the vehicle control terminal 30. Further, the interface 202 transmits local waypoints (to be described later) generated by the analysis unit 206 to the vehicle control terminal 30, and transmits information on status of the local server 20 or 20' to the global server 10.

The information collection unit 204 collects the information received via the interface 202.

The analysis unit 206 generates the local waypoints based on the information collected by the information collection unit 204 and information sensed by the sensing unit 208 (to be described later). Further, the analysis unit 206 analyzes information on the status of the local server 20 or 20' itself. Thus generated local waypoints and the analyzed status information are provided to the interface 202.

The sensing unit 208 obtains information on road environment by using sensors, e.g., image sensors, laser sensors, radar sensors and ultrasonic sensors, installed on the road and detects whether abnormalities have occurred in those sensors. The information obtained by the sensing unit 208 is provided to the analysis unit 206.

The vehicle sensing information DB 210 stores therein the road environment information obtained by the sensing unit 208 and the target vehicle information received via the interface 202.

Figure 6:
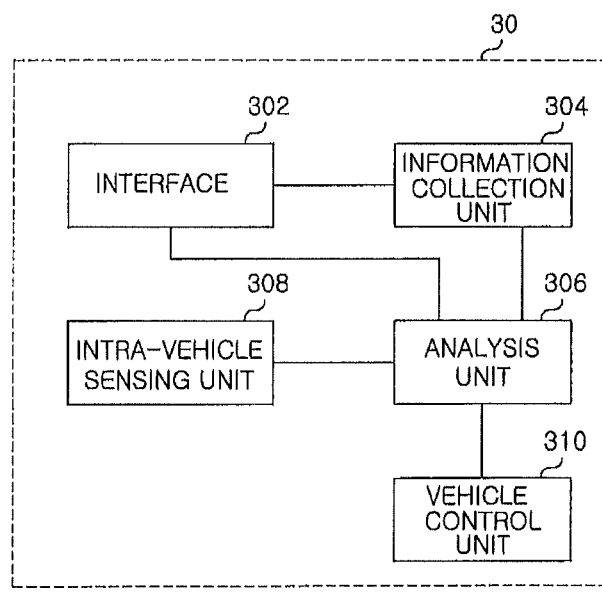
FIG. 6 illustrates a detail view of the vehicle control terminal of FIG. 1.

FIG. 6 illustrates a detail view of the vehicle control terminal 30 of FIG. 1. As shown in FIG. 6, the vehicle control terminal 30 may include an interface 302, an information collection unit 304, an analysis unit 306, an intra-vehicle sensing unit 308 and a vehicle control unit 310.

The interface 302 receives the local waypoints from the local server 20 or 20' and transmits the local waypoints to the information collection unit 304.

The information collection unit 304 collects the local waypoints received via the interface 302 and provides the local waypoints to the analysis unit 306.

The analysis unit 306 analyzes both the local waypoints collected by the information collection unit 304 and current driving status of the target vehicle sensed by the intra-vehicle sensing unit 308 (to be described later).

The intra-vehicle sensing unit 308 senses the current driving status of the target vehicle, e.g., information on a location, a headway angle with respect to a traveling traffic lane and a steering wheel angle of the target vehicle. Here, the location of the target vehicle can be measured by using a GPS (Global Positioning System) and an IMU (Inertial Measurement Unit, for example.

The vehicle control unit 310 generates vehicle control data necessary for driving the target vehicle, e.g., information on a rotation angle of a steering wheel and a stepping amount of an accelerator or a brake, based on the local waypoints and the driving status of the target vehicle analyzed by the analysis unit 306. The vehicle control unit 310 controls the target vehicle according to thus generated vehicle control data in cooperation with interworking devices of the target vehicle, e.g., an ECU (Electronic Control Unit), a steering system and a suspension.

Hereinafter, a cell-based vehicle driving control method using the above-described vehicle driving control system will be described in detail with reference to FIGS. 7 to 10. Below, it is assumed that the target vehicle is located within the cell coverage A of the local server 20.

Figure 7:
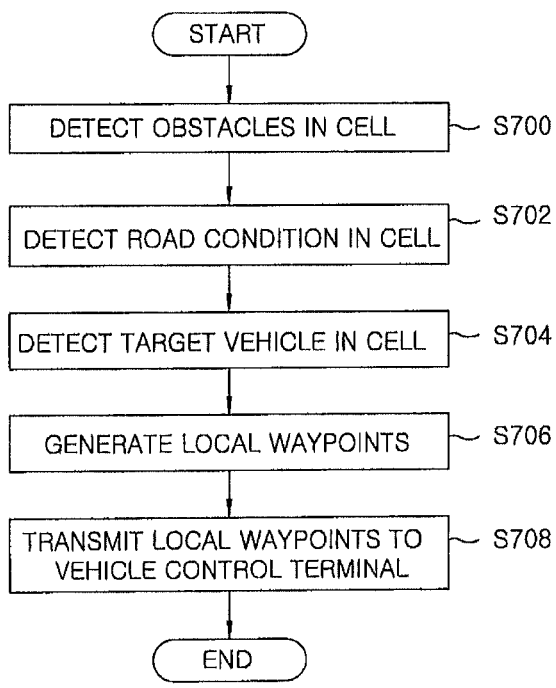
FIG. 7 illustrates a flowchart of a procedure in which the local server transmits control information to the vehicle control terminal.

FIG. 7 illustrates a flowchart of a procedure in which the local server 20 transmits control information to the vehicle control terminal 30.

As shown in FIG. 7, the local server 20 obtains information on road environment within its cell coverage A by using the sensors installed on the road. To be specific, the local server 20 detects obstacles within the cell coverage A (step S700) and road condition within the cell coverage A (step S702). The detection of the obstacles and road condition may be performed by the sensing unit 208 of the local server 20. Here, the detection of the obstacles may be implemented by image sensors, laser sensors, radar sensors and ultrasonic sensors installed on the road. The obstacles may include objects interrupting travelling of the target vehicle, e.g., vehicles other than the target vehicle and pedestrians. The detection of the road condition may refer to the detection of freezing or damage of the road and landslide, for example.

The local server 20 detects the target vehicle within the cell coverage A (step S704). The detection of the target vehicle may be performed via the interface 202 of the local server 20. Here, the target vehicle denotes a vehicle to be driven under a control of the local server 20. The target vehicle may have the vehicle control terminal 30 mounted therein.

After the steps S700, S702 and S704, the local server 20 collects relevant obtained information and target vehicle information and generates local waypoints based on thus collected information (step S706). The term 'local waypoints' means spaces within the cell coverage A on which the target vehicle can stably travel and may be defined by a set of X and Y coordinates of the node data of FIG. 3 or images.

Thus generated local waypoints are transmitted to the vehicle control terminal 30 via the interface 202 (step S708).

Figure 8:
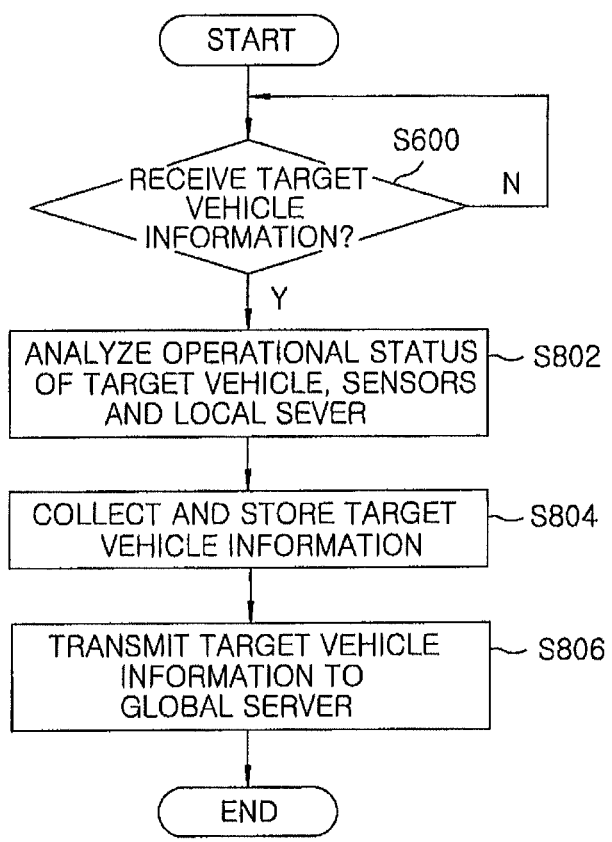
FIG. 8 illustrates a flowchart of a procedure in which the local server transmits vehicle information to the global server.

FIG. 8 illustrates a flowchart of a procedure in which the local server 20 transmits vehicle information to the global server 10.

As shown in FIG. 8, the local server 20 determines whether the target vehicle information, e.g., information on whether the vehicle can move, information on the status of vehicle components and information on whether abnormalities have occurred in the target vehicle, has been received from the vehicle control terminal 30 (step S800). If it is determined in the step S800 that the target vehicle information has been received, the local server 20 analyzes operational status of the target vehicle, the sensors installed on the road and the local server 20 itself (step S802).

Thereafter, the local server 20 collects and stores the received target vehicle information (step S804) and transmits the target vehicle information to the global server 10 (step S806).

Figure 9:
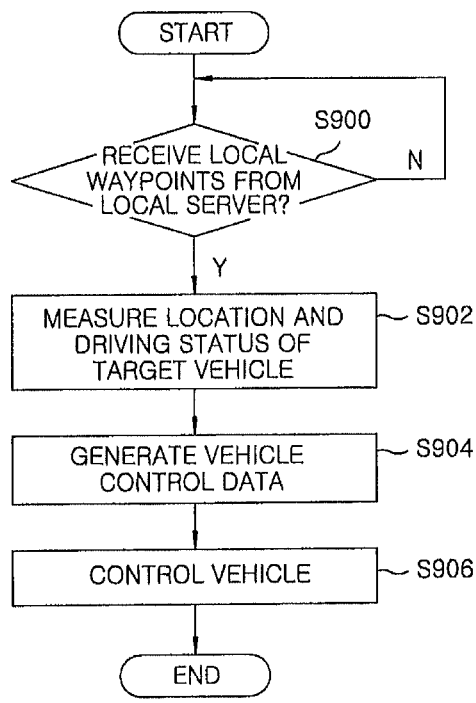
FIG. 9 illustrates a flowchart of a procedure in which the vehicle control terminal controls a vehicle.
Figure 10:
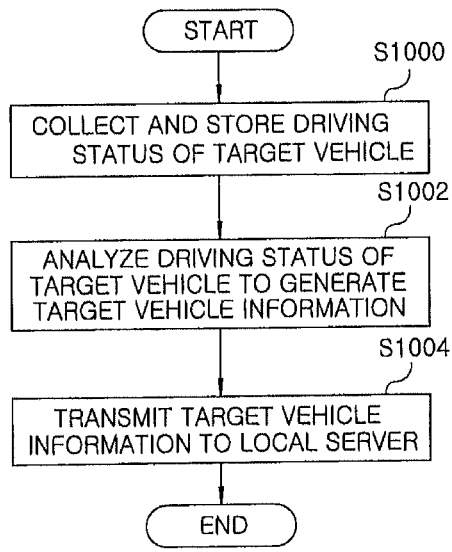
FIG. 10 illustrates a flowchart of a procedure in which the vehicle control terminal transmits vehicle status information to the local server.

FIGS. 9 and 10 are flowcharts illustrating a vehicle control method using a network according to an embodiment of the present invention, in detail, a vehicle control process performed by the vehicle control terminal 30.

FIG. 9 illustrates a flowchart of a procedure in which the vehicle control terminal 30 controls the target vehicle.

It is determined whether the local waypoints have been received from the local server 20 (step S900).

If it is determined in the step S900 that the local waypoints have been received, the vehicle control terminal 30 measures the location and the driving status of the target vehicle in the cell coverage A (step S902). Here, the location of the target vehicle can be measured by using GPS (Global Positioning System) information and IMU (Inertial Measurement Unit) information, for example. The driving status of the target vehicle can be measured by detecting the steering wheel angle and the headway angle of the target vehicle with respect to the traveling traffic lane, for example.

Based on the local waypoints and the location and driving status of the target vehicle, the vehicle control terminal 30 generates vehicle control data, e.g., information on a rotation angle of a steering wheel and a stepping amount of an accelerator or a brake (step S904).

The vehicle control terminal 30 controls the target vehicle in cooperation with the interworking devices of the target vehicle, e.g., an ECU, a steering system and a suspension, based on the vehicle control data generated in the step S904 (step S906).

FIG. 10 illustrates a flowchart of a procedure in which the vehicle control terminal 30 transmits vehicle status information to the local server 20.

The vehicle control terminal 30 collects and stores the driving status of the target vehicle (step S1000).

Thereafter, the vehicle control terminal 30 analyzes the driving status of the target vehicle to generate the target vehicle information (step S1002).

The vehicle control terminal 30 transmits the target vehicle information generated in the step S1002 to the local server 20 via the interface 302 (step S1004).

While the invention has been shown and described with respect to the embodiments, it will be understood by those skilled in the art that various changes and modification may be made without departing from the scope of the invention as defined in the following claims.

What is claimed is:

1. A cell-based vehicle driving control method, comprising:
   obtaining, by a processor, road environment information on roads within a cell and target vehicle information on a target vehicle within the cell; and
   generating, by the processor, local waypoints based on the road environment information and the target vehicle information and transmitting the local waypoints to the target vehicle,
   wherein the road environment information is obtained by using at least one sensor installed on the roads and includes information on obstacles on the roads and road condition of the roads, and
   wherein the target vehicle information includes information on whether the target vehicle can move or not, information on status of vehicle components and information on whether abnormalities have occurred in the vehicle.

2. The vehicle driving control method of claim 1, wherein said at least one sensor includes an image sensor, a laser sensor, a radar sensor and an ultrasonic sensor.

3. The vehicle driving control method of claim 1, wherein the local waypoints are coordinate spaces within the cell on which the target vehicle can travel.

4. A cell-based vehicle driving control method, comprising:
   receiving, by a processor, local waypoints in a cell transmitted from a local sever provided for the cell;
   measuring, by the processor, a location and driving status of a target vehicle within the cell;
   generating vehicle control data for the target vehicle based on the received local waypoints and the measured location and driving status of the target vehicle; and
   controlling the target vehicle according to the generated vehicle control data,
   wherein the driving status of the target vehicle includes one or more of a headway angle of the target vehicle with respect to a traveling traffic lane and a steering wheel angle of the target vehicle, and wherein the target vehicle information includes information on whether the target vehicle can move or not, information on status of vehicle components and information on whether abnormalities have occurred in the vehicle.

5. The vehicle driving control method of claim 4, wherein the location of the target vehicle is measured by using one or more of GPS (Global Positioning System) information and IMU (Inertial Measurement Unit) information of the target vehicle.

6. The vehicle driving control method of claim 4, wherein the vehicle control data includes one or more of a rotation angle of a steering wheel and a stepping amount of an accelerator or a brake.

7. The vehicle driving control method of claim 4, further comprising:
collecting the driving status of the target vehicle;
analyzing the collected driving status to generate target vehicle information; and
transmitting the target vehicle information to the local server.

8. A cell-based vehicle driving control system, comprising:
a local server for obtaining road environment information on roads within a cell and target vehicle information on a target vehicle within the cell and generating local waypoints based on the road environment information and the target vehicle information, the road environment information being obtained by using at least one sensor installed on the roads;
a global server for monitoring the target vehicle information, the road environment information and local server information on the local server received from the local server; and
a vehicle control terminal, mounted in the target vehicle, for receiving the local waypoints transmitted from the local server and controlling the target vehicle based on the local waypoints,
wherein the local server transmits the target vehicle information, status of sensors, status of the local server, information on locations and operational status of the local server to the global server, and analyzes operational status of the target vehicle and the sensors installed on the road and the local server.

9. The vehicle driving control system of claim 8, wherein said at least one sensor includes an image sensor, a laser sensor, a radar sensor and an ultrasonic sensor.

10. The vehicle driving control system of claim 8, wherein the local server information includes a location and operational status of the local server.

11. The vehicle driving control system of claim 8, wherein the global server administrates a handover procedure of the target vehicle when the target vehicle moves from the cell managed by the local server to a cell managed by another local server.

12. The vehicle driving control system of claim 8, wherein the local server wirelessly receives the target vehicle information from the vehicle control terminal and wirelessly transmits the local waypoints to the vehicle control terminal; and
wherein the local server transmits the target vehicle information, the road environment information and the local server information to the global server.

13. The vehicle driving control system of claim 12, wherein the road environment information includes information on obstacles on the roads and road condition of the roads.

14. The vehicle driving control system of claim 8, wherein the global server includes:
an interface for receiving the target vehicle information and the road environment information from the local server;
an analysis unit for analyzing the target vehicle information and the road environment information received via the interface; and
a road network database for storing therein road network data modeled from actual road data,
wherein analysis unit manages the road network data by using analysis results thereof.

15. The vehicle driving control system of claim 14, wherein the road network data includes node data and link data.

16. The vehicle driving control system of claim 8, wherein the local server includes:
an interface for receiving the target vehicle information from the vehicle control terminal, transmitting the local waypoints to the vehicle control terminal and transmitting the target vehicle information, the road environment information and the local server information to the global server;
an information collection unit for collecting the target vehicle information received via the interface;
a sensing unit for obtaining the road environment information by using said at least one sensor and detecting abnormalities of said at least one sensor; and
an analysis unit for generating the local waypoints and providing the local waypoints to the interface.

17. The vehicle driving control system of claim 8, wherein the target vehicle information includes whether the target vehicle can move or not, status of components of the target vehicle and whether abnormalities have occurred in the target vehicle.

18. The vehicle driving control system of claim 8, wherein the vehicle control terminal includes:
an interface for receiving the local waypoints from the local server;
an information collection unit for collecting the local waypoints received via the interface;
a sensing unit for obtaining driving status of the target vehicle, the driving status including a location of the target vehicle, a headway angle of the target vehicle with respect to a traveling traffic lane and a steering wheel angle of the target vehicle;
an analysis unit for analyzing the local waypoints collected by the information collection unit and the driving status of the target vehicle sensed by the sensing unit; and
a vehicle control unit for generating vehicle control data based on the local waypoints and the driving status information analyzed by the analysis unit, and controlling the target vehicle according to the generated vehicle control data.

* * * * *